United States Patent
Terashima et al.

(10) Patent No.: US 10,715,266 B2
(45) Date of Patent: Jul. 14, 2020

(54) BROADCAST RECEIVER

(71) Applicant: DENSO TEN Limited, Kobe-shi, Hyogo (JP)

(72) Inventors: Yuya Terashima, Kobe (JP); Kenichi Nakano, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 0 days.

(21) Appl. No.: 16/457,039

(22) Filed: Jun. 28, 2019

(65) Prior Publication Data

US 2020/0036461 A1 Jan. 30, 2020

(30) Foreign Application Priority Data

Jul. 30, 2018 (JP) .................................. 2018-142060

(51) Int. Cl.
*H04H 40/18* (2008.01)
*H04B 1/16* (2006.01)
*H04B 17/318* (2015.01)

(52) U.S. Cl.
CPC ........... *H04H 40/18* (2013.01); *H04B 1/1638* (2013.01); *H04B 17/318* (2015.01)

(58) Field of Classification Search
None
See application file for complete search history.

(56) References Cited

U.S. PATENT DOCUMENTS

| 7,747,251 | B1 * | 6/2010 | Pippert ................. | H04W 8/183 370/328 |
| RE45,737 | E * | 10/2015 | Oshima ................ | G06Q 20/045 |
| 2003/0139190 | A1 * | 7/2003 | Steelberg ............... | G06Q 20/10 455/456.1 |
| 2005/0220104 | A1 * | 10/2005 | Tsujikado ............. | H04L 12/185 370/390 |
| 2008/0020740 | A1 * | 1/2008 | Koshijima ........ | H04M 1/72522 455/414.2 |
| 2009/0064227 | A1 * | 3/2009 | Eronen .................. | H04N 21/84 725/46 |

(Continued)

FOREIGN PATENT DOCUMENTS

| EP | 2632065 B1 * | 5/2018 |
| JP | 2008-109694 A | 5/2008 |
| JP | 2008109694 A * | 5/2008 |

*Primary Examiner* — Lana N Le
(74) *Attorney, Agent, or Firm* — Oliff PLC

(57) ABSTRACT

To provide a technology of updating a broadcast station list capable of both shortening a searching time and deleting an unreceivable broadcast station.
A broadcast receiver includes a processor and an associated memory configured to: control a tuner to scan a predetermined frequency band and search for a receivable broadcast station in the predetermined frequency band; and create a list including at least the receivable broadcast station by acquiring information of the receivable broadcast station. When there is a second receivable digital broadcast station at a frequency corresponding to a first digital broadcast station that already exists in the list when scanning, the processor omits acquisition of broadcast station information of the second digital broadcast station and uses broadcast station information of the first digital broadcast station that exists in the list as information of the second digital broadcast station.

6 Claims, 4 Drawing Sheets

(56) References Cited

U.S. PATENT DOCUMENTS

| | | | | |
|---|---|---|---|---|
| 2010/0240381 | A1* | 9/2010 | Yamada | H04M 3/42068 |
| | | | | 455/450 |
| 2011/0249193 | A1* | 10/2011 | Inoo | H04N 21/6112 |
| | | | | 348/726 |
| 2012/0309400 | A1* | 12/2012 | Inumaru | H04W 76/40 |
| | | | | 455/438 |
| 2013/0244566 | A1* | 9/2013 | Murahata | H04H 60/41 |
| | | | | 455/3.06 |
| 2014/0125641 | A1* | 5/2014 | Tajima | H04H 60/11 |
| | | | | 345/204 |
| 2014/0327834 | A1* | 11/2014 | Takaki | H03J 1/0075 |
| | | | | 348/731 |
| 2014/0379479 | A1* | 12/2014 | Zeniya | G06Q 30/0261 |
| | | | | 705/14.58 |
| 2016/0234559 | A1* | 8/2016 | Gobara | H04N 5/765 |
| 2016/0360019 | A1* | 12/2016 | Ellis | H04H 20/71 |

\* cited by examiner

BROADCAST RECEIVER

BACKGROUND OF THE INVENTION

Field of the Invention

The invention relates to a technology of updating a broadcast station list in a broadcast receiver.

Description of the Background Art

Normally, the broadcast receiver has a function of displaying the broadcast station list. The function of displaying the broadcast station list is a function of searching an entire receiving frequency band, listing and displaying a receivable broadcast station.

In the function of displaying the broadcast station list of the broadcast receiver that receives a digital broadcast, information of a digital broadcast station is acquired, and the acquired information is included in the broadcast station list. However, since the information of the digital broadcast station is required to be decoded, it takes a long time to create the broadcast station list including the information of the digital broadcast station.

When especially the broadcast receiver is configured to create the broadcast station list using the same tuner as a tuner that receives a broadcast, a user cannot enjoy a broadcast program while the broadcast station list being created. Therefore, it is desirable that a time for creating the broadcast station list is shortened.

Therefore, a digital broadcast receiver disclosed in a patent document 1 performs a search, records the broadcast station whose broadcast waves have been successfully received in a station selection success list and skips the broadcast station that has been successfully selected in the past so as to use only a newly tuned broadcast station for a station selection operation. As a result, a searching time for updating the broadcast station list is shortened.

However, for example, when the digital broadcast receiver disclosed in the patent document 1 is mounted on a mobile body, even when the broadcast station list is updated in a state in which the mobile body has been moved out of a receivable area of the broadcast station recorded in the station selection success list, there is a problem that an unreceivable broadcast station remains in the broadcast station list.

SUMMARY OF THE INVENTION

According to one aspect of the invention, a broadcast receiver includes a processor and an associated memory configured to: control a tuner to scan a predetermined frequency band and search for a receivable broadcast station in the predetermined frequency band; and create a list including at least the receivable broadcast station by acquiring information of the receivable broadcast station. When there is a second receivable digital broadcast station at a frequency corresponding to a first digital broadcast station that already exists in the list when scanning, the processor omits acquisition of broadcast station information of the second digital broadcast station and uses broadcast station information of the first digital broadcast station that exists in the list as information of the second digital broadcast station.

As a result, the broadcast receiver can shorten a searching time for creating a broadcast station list.

According to another aspect of the invention, when there is no second receivable digital broadcast station at the frequency corresponding to the first digital broadcast station, the processor deletes the first digital broadcast station from the list.

As a result, the broadcast receiver can delete an unreceivable broadcast station from the broadcast station list.

According to another aspect of the invention, even when there is the second receivable digital broadcast station at the frequency corresponding to the first digital broadcast station, the processor does not omit the acquisition of the broadcast station information of the second digital broadcast station when an ID of the second digital broadcast station does not correspond to an ID of the first digital broadcast station.

As a result, the broadcast receiver can update the broadcast station list to the latest state.

Therefore, an object of the invention is to provide a technology of updating the broadcast station list that can both shorten the searching time and maintain correctness of the broadcast station list.

These and other objects, features, aspects and advantages of the invention will become more apparent from the following detailed description of the invention when taken in conjunction with the accompanying drawings.

DESCRIPTION OF THE EMBODIMENTS

An exemplified embodiment of the invention will be described in detail below with reference to accompanying drawings.

<1. Configuration of Broadcast Receiver>

Figure 1:
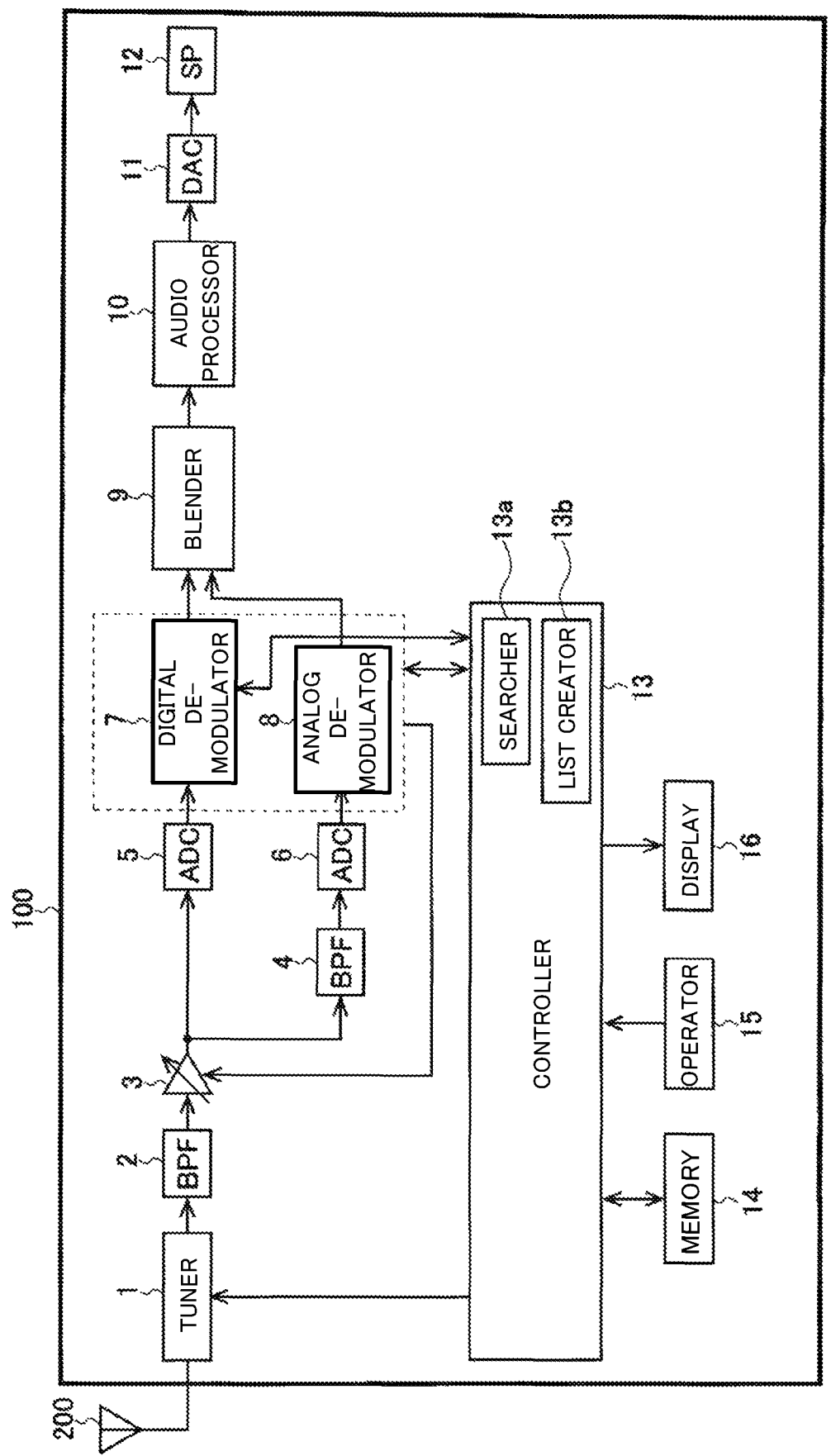
FIG. 1 is a block diagram illustrating a configuration example of a broadcast receiver.

FIG. 1 is a block diagram-illustrating a configuration example of a broadcast receiver 100. The broadcast receiver 100 is a receiver that receives an audio broadcast of IBOC (In Band On Channel) system in which the same broadcast content is simultaneously broadcasted by a digital broadcast and an analog broadcast. An antenna 200 receives a transmitted radio wave from a broadcast station, converts the transmitted radio wave into a broadcast signal and transmits the broadcast signal to the broadcast receiver 100.

The broadcast receiver 100 includes a tuner 1, a bandpass filter 2, a variable gain amplifier 3, a bandpass filter 4, an A/D converter 5, an A/D converter 6, a digital demodulator 7 and an analog demodulator 8.

The tuner 1 converts the broadcast signal from the antenna 200 into an intermediate frequency signal (IF signal) according to an instruction of a controller 13 described later. The tuner 1 transmits the IF signal to the bandpass filter 2.

The bandpass filter 2 removes a frequency component other than an intermediate frequency component that is used in the analog broadcast and the digital broadcast from the IF signal.

The variable gain amplifier 3 amplifies the IF signal that is transmitted from the bandpass filter 2. A gain of the variable gain amplifier 3 varies according to an AGC (Automatic Gain Control) signal that is transmitted from the demodulators (the digital demodulator 7 and the analog demodulator 8).

The bandpass filter 4 removes a frequency component other than an intermediate frequency component that is used in the analog broadcast from the IF signal.

The A/D converter 5 converts the IF signal of a digital broadcast wave as an analog signal that is transmitted from the variable gain amplifier 3 into the IF signal of the digital broadcast wave as a digital signal The A/D converter 6 converts the IF signal of an analog broadcast wave as the analog signal that is transmitted from the bandpass filter 4 into the IF signal of the analog broadcast wave as the digital signal The digital demodulator 7 demodulates and decodes the digital broadcast wave on the IF signal of the digital broadcast wave that is transmitted from the A/D converter 5. On the other hand, the analog demodulator 8 demodulates the analog broadcast wave on the IF signal of the analog broadcast wave that is transmitted from the A/D converter 6. The demodulators (the digital demodulator 7 and the analog demodulator 8) generate the AGC signal based on a reception strength of the digital broadcast wave when the digital broadcast wave is detected and generate the AGC signal based on a reception strength of the analog broadcast wave when the digital broadcast wave is not detected.

The broadcast receiver 100 further includes a blender 9, an audio processor 10, a D/A converter 11, a speaker 12, the controller 13, a memory 14, an operator 15 and a display 16.

The blender 9 mixes (blends) a demodulated digital broadcast audio signal that is transmitted from the digital demodulator 7 with a demodulated analog broadcast audio signal that is transmitted from the analog demodulator 8 at an arbitrary mixing (blending) ratio.

The audio processor 10 changes acoustic characteristics of the mixed audio signal that is transmitted from the blender 9.

The D/A converter 11 converts a digital audio signal that is transmitted from the audio processor 10 into an analog audio signal and outputs the analog audio signal to the speaker 12.

The speaker 12 outputs a sound according to the analog audio signal.

The controller 13 is configured by, for example, an MPU (Micro Processing Unit), executes a control program that is stored in the memory 14 in a volatile manner and controls the entire broadcast receiver 100. The controller 13 includes a searcher 13a and a list creator 13b as a function implemented by software. The searcher 13a controls the tuner 1 to scan a predetermined frequency band (e.g., an FM frequency band of 88 to 108 MHz and an AM frequency band of 530 to 1710 kHz) and to search for a receivable broadcast station. The list creator 13b creates a list of the receivable broadcast station and stores the created broadcast station list in the memory 14. When the list creator 13b creates the broadcast station list two or more times, the second and subsequent broadcast station list is created by updating the broadcast station list.

The memory 14 is configured by a non-volatile memory, such as a ROM (Read Only Memory) and a work memory, such as a RAM (Random Access Memory).

The operator 15 is configured by, for example, a button, a touch panel, an audio input apparatus, and the like, and receives an operation input by a user and outputs contents of the received operation input to the controller 13.

The display 16 is configured by, for example, a liquid crystal display device and displays the broadcast station list, and the like, created by the list creator 13b.

<2. Operation of Broadcast Receiver>

Figure 2:
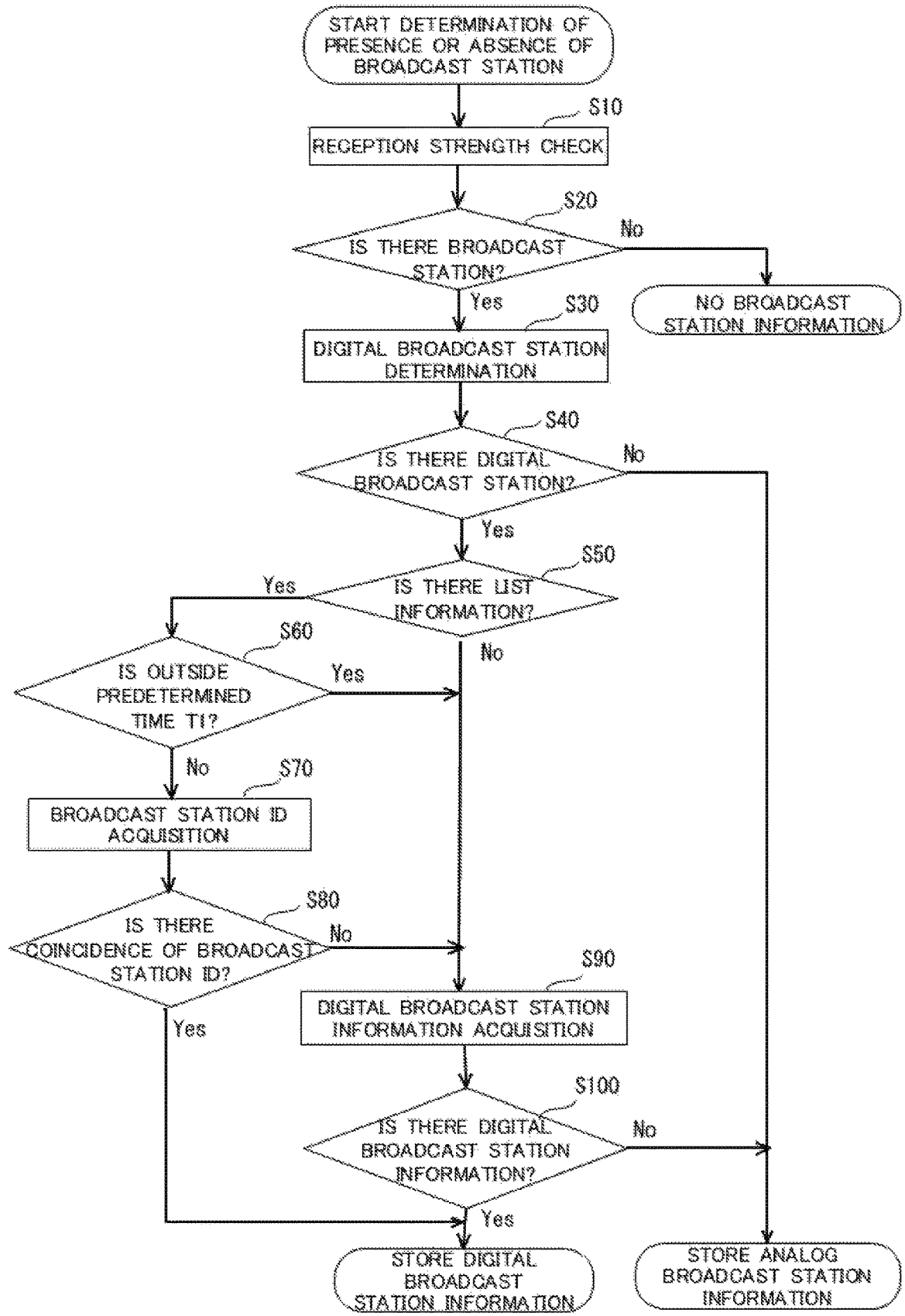
FIG. 2 is a flowchart illustrating one example of a determination process executed when creating a broadcast station list.

FIG. 2 is a flowchart illustrating one example of a determination process executed when creating the broadcast station list. The broadcast receiver 100 executes the determination process shown in FIG. 2 at each frequency (discrete value) that is scanned by the searcher 13a.

First, the controller 13 issues a command of "reception strength check" to the demodulators (the digital demodulator 7 and the analog demodulator 8) (a step S10). According to the command of "reception strength check", when the digital broadcast wave has been detected, the demodulators (the digital demodulator 7 and the analog demodulator 8) send information about the reception strength of the digital broadcast wave to the controller 13. When the digital broadcast wave has not been detected, the demodulators (the digital demodulator 7 and the analog demodulator 8) send information about the reception strength of the analog broadcast wave to the controller 13.

Next, the controller 13 determines whether or not there is a receivable broadcast station at the frequency held by the searcher 13a using the information about the reception strength acquired from the demodulators (the digital demodulator 7 and the analog demodulator 8) (a step S20).

Specifically, when the reception strength is less than a predetermined level, the controller 13 determines that there is no receivable broadcast station at the frequency held by the searcher 13a (No in the step S20) and ends a flow operation shown in FIG. 2 without adding information of the broadcast station to the broadcast station list. When a digital broadcast station corresponding to the frequency held by the searcher 13a already exists in the broadcast station list, the list creator 13b deletes the digital broadcast station corresponding to the frequency held by the searcher 13a from the broadcast station list. By this deletion process, a problem that an unreceivable digital broadcast station remains in the broadcast station list is solved when the broadcast station list is updated.

On the other hand, when the reception strength is equal to or more than the predetermined level, the controller 13 determines that there is a receivable broadcast station at the frequency held by the searcher 13a (Yes in the step S20) and the process moves to a step S30.

In the step S30, the controller 13 issues a command of "digital broadcast station determination" to the digital demodulator 7. The digital demodulator 7 sends information about a presence or absence of detection of the digital broadcast wave to the controller 13.

Next, the controller 13 determines whether or not there is a receivable digital broadcast station at the frequency held by the searcher 13a using the information about a presence or absence of detection of the digital broadcast wave acquired from the digital demodulator 7 (a step S40).

Specifically, when the digital broadcast wave has not been detected, the controller 13 determines that there is no receivable digital broadcast station at the frequency held by the searcher 13a (No in the step S40), adds information of an analog broadcast station corresponding to the frequency held by the searcher 13a to the broadcast station list and ends the flow operation shown in FIG. 2. When the digital broadcast station corresponding to the frequency held by the searcher 13a already exists in the broadcast station list, the list creator 13b deletes the digital broadcast station corresponding to the frequency held by the searcher 13a from the broadcast station list. By this deletion process, the problem that the unreceivable digital broadcast station remains in the broadcast station list is solved when the broadcast station list is updated.

On the other hand, when the digital broadcast wave has been detected, the controller 13 determines that there is a receivable digital broadcast station at the frequency held by the searcher 13a (Yes in the step S40) and the process moves to a step S50.

In the step S50, the list creator 13b determines whether or not the digital broadcast station corresponding to the frequency held by the searcher 13a already exists in the broadcast station list.

When it is determined that there is no digital broadcast station corresponding to the frequency held by the searcher 13a in the broadcast station list (No in the step S50), the list creator 13b issues a command of "digital broadcast station information acquisition" to the digital demodulator 7 (a step S90). The digital demodulator 7 completes a decode process according to the command of "digital broadcast station information acquisition" and sends all the broadcast station information of the digital broadcast station corresponding to the frequency held by the searcher 13a to the controller 13.

However, in a case where a reception environment is bad, even when the decode process has been completed, in some cases, the digital demodulator 7 cannot acquire the broadcast station information. Therefore, in a step S100 following the step S90, the list creator 13b determines whether or not the broadcast station information of the digital broadcast station corresponding to the frequency held by the searcher 13a has been acquired.

When it is determined that the broadcast station information of the digital broadcast station corresponding to the frequency held by the searcher 13a has been acquired (Yes in the step S100), the list creator 13b destroys the broadcast station information that already exists in the broadcast station list of the digital broadcast station corresponding to the frequency held by the searcher 13a and reflects newly acquired broadcast station information in the broadcast station list. On the other hand, when it is determined that the broadcast station information of the digital broadcast station corresponding to the frequency held by the searcher 13a has not been acquired (No in the step S100), information of the analog broadcast station corresponding to the frequency held by the searcher 13a is added to the broadcast station list, and a flow operation shown in FIG. 2 is ended.

In the determination process of the step S50, it is determined that the digital broadcast station corresponding to the frequency held by the searcher 13a exists in the broadcast station list (Yes in the step S50), the process moves to a step S60.

In a case where the process moves to the step S60, when results of the determination processes in the steps S60 and S80 satisfy a predetermined condition, the list creator 13b continuously adopts the broadcast station information that already exists in the broadcast station list of the digital broadcast station corresponding to the frequency held by the searcher 13a without executing a process of the step S90. As a result, it is possible to reduce a time necessary for the decode process and thus shorten a searching time.

Specifically, in the step S60, the list creator 13b determines whether or not an elapsed time ET1 from a time at which the broadcast station information that already exists in the broadcast station list of the digital broadcast station corresponding to the frequency held by the searcher 13a has been acquired exceeds a predetermined time T1. The predetermined time T1 corresponds to a "second predetermined time" described in the claims.

When it is determined that the elapsed time ET1 exceeds the predetermined time T1 (Yes in the step S60), the process moves to the step S90. As a result, in a case where the digital broadcast station changes the broadcast station information, a problem that old broadcast station information remains in the broadcast station list is solved when the broadcast station list is updated after the elapsed time ET1 exceeds the predetermined time T1.

On the other hand, when it is determined that the elapsed time ET1 does not exceed the predetermined time T1 (No in the step S60), the list creator 13b issues a command of "broadcast station ID acquisition" to the digital demodulator 7 (a step S70). The digital demodulator 7 executes the decode process necessary for acquiring a broadcast station ID and sends information about the broadcast station ID to the controller 13 according to the command of "broadcast station ID acquisition".

In a step S80 following the step S70, for the digital broadcast station corresponding to the frequency held by the searcher 13a, the list creator 13b determines whether or not the broadcast station ID that already exists in the broadcast station list corresponds to a newly acquired broadcast station ID.

When it is determined that the broadcast station ID that already exists in the broadcast station list does not correspond to the newly acquired broadcast station ID (No in the step S80), the process moves to the step S90. As a result, when the broadcast receiver 100 moves to a receivable area of another digital broadcast station corresponding to the same frequency as the digital broadcast station that exists in the broadcast station list, a problem that a digital broadcast station different from the digital broadcast station that exists in the broadcast station list is received is solved when the broadcast station list is updated.

When it is determined that the broadcast station ID that already exists in the broadcast station list corresponds to the newly acquired broadcast station ID (Yes in the step S80), the list creator 13b continuously adopts the broadcast station information that already exists in the broadcast station list of the digital broadcast station corresponding to the frequency held by the searcher 13a without executing the process of the step S90.

As described above, the broadcast receiver 100 executes the determination process shown in FIG. 2 at each frequency (discrete value) that is scanned by the searcher 13a. That is, different from the digital broadcast receiver that is disclosed in the patent document 1, the broadcast receiver 100 does not skip the frequency corresponding to the digital broadcast station that already exists in the broadcast station list when the broadcast station list is updated. Therefore, in the broadcast receiver 100, when the broadcast station list is updated, it is possible to delete the unreceivable digital broadcast station from the broadcast station list.

Figure 3:
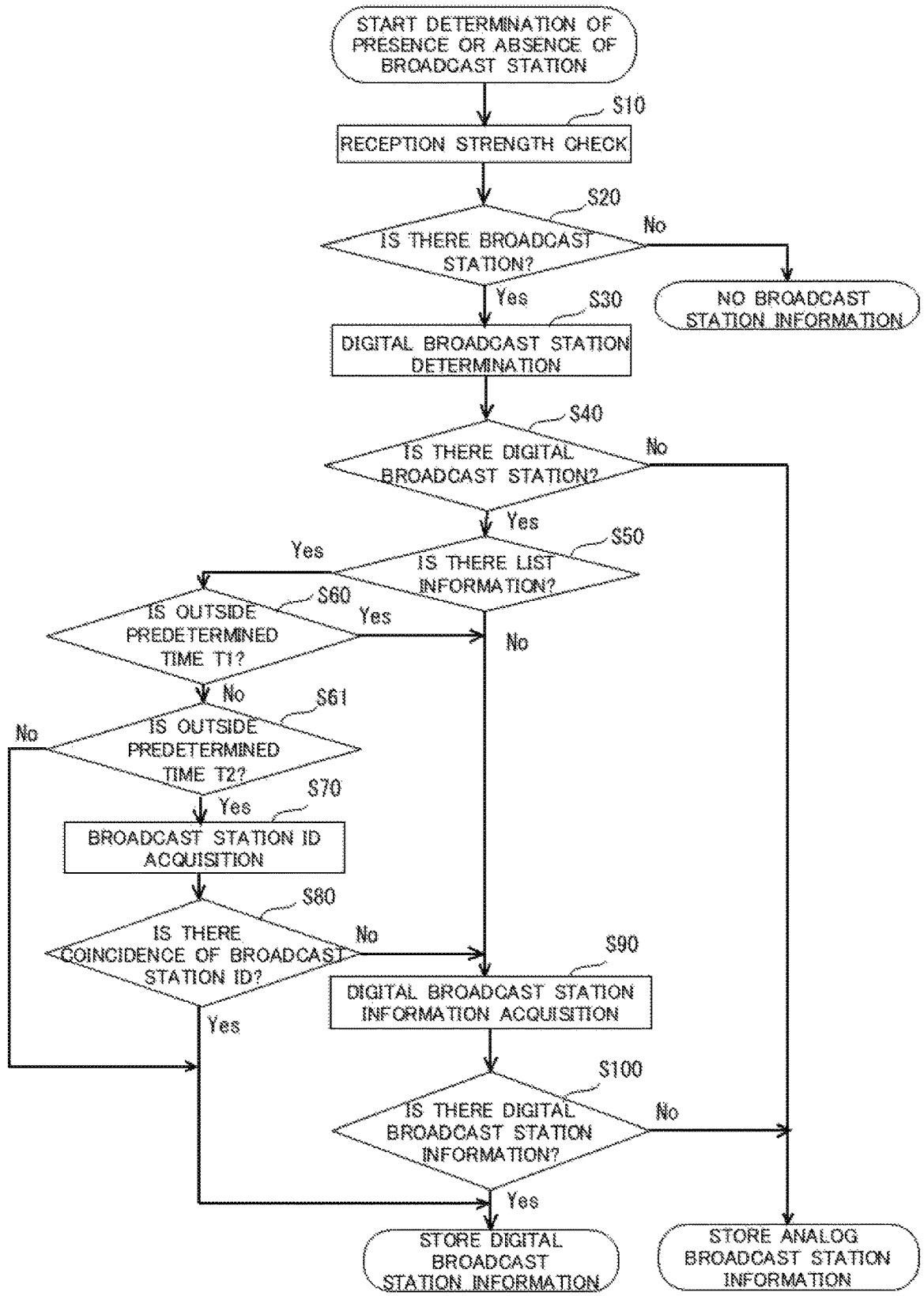
FIG. 3 is a flowchart illustrating another example of the determination process executed when creating the broadcast station list.

For example, the broadcast receiver 100 may execute the determination process shown in FIG. 3 instead of the determination process shown in FIG. 2 at each frequency (discrete value) that is scanned by the searcher 13a.

FIG. 3 shows the determination process in which a process of a step S61 is added to the determination process shown in FIG. 2

The step S61 is provided between the step S60 and the step S70.

In the determination process shown in FIG. 3, when it is determined that the elapsed time ET1 does not exceed the predetermined time T1 (No in the step S60), the list creator 13b determines whether or not an elapsed time ET2 from a time at which the broadcast station information of the digital broadcast station corresponding to the frequency held by the searcher 13a has been acquired exceeds a predetermined time T2 (the step S61). The predetermined time T2 corresponds to a "first predetermined time" described in the claims.

When it is determined that the elapsed time ET2 exceeds the predetermined time T2 (Yes in the step S61), the process moves to the step S70.

On the other hand, when it is determined that the elapsed time ET2 does not exceed the predetermined time T2 (No in the step S61), the list creator 13b continuously adopts the broadcast station information that already exists in the broadcast station list of the digital broadcast station corresponding to the frequency held by the searcher 13a without executing the processes of the steps S70 and S80. As a result, when there is less possibility that the broadcast receiver 100 moves to a receivable area of another digital broadcast station corresponding to the same frequency as the digital broadcast station that exists in the broadcast station list, the processes of the steps S70 and S80 may be omitted.

It is desirable that the list creator 13b sets the predetermined time T1 and the predetermined time T2 to different values from each other. In the case where the digital broadcast station changes the broadcast station information, the predetermined time (predetermined time T1) is used for solving the problem that the old broadcast station information remains in the broadcast station list, and the predetermined time (predetermined time T2) is used for solving the problem that the digital broadcast station different from the digital broadcast station that exists in the broadcast station list is received. By setting the predetermined time T1 and the predetermined time T2 to different values from each other, the predetermined time T1 and the predetermined time T2 can be separately optimized.

Figure 4:
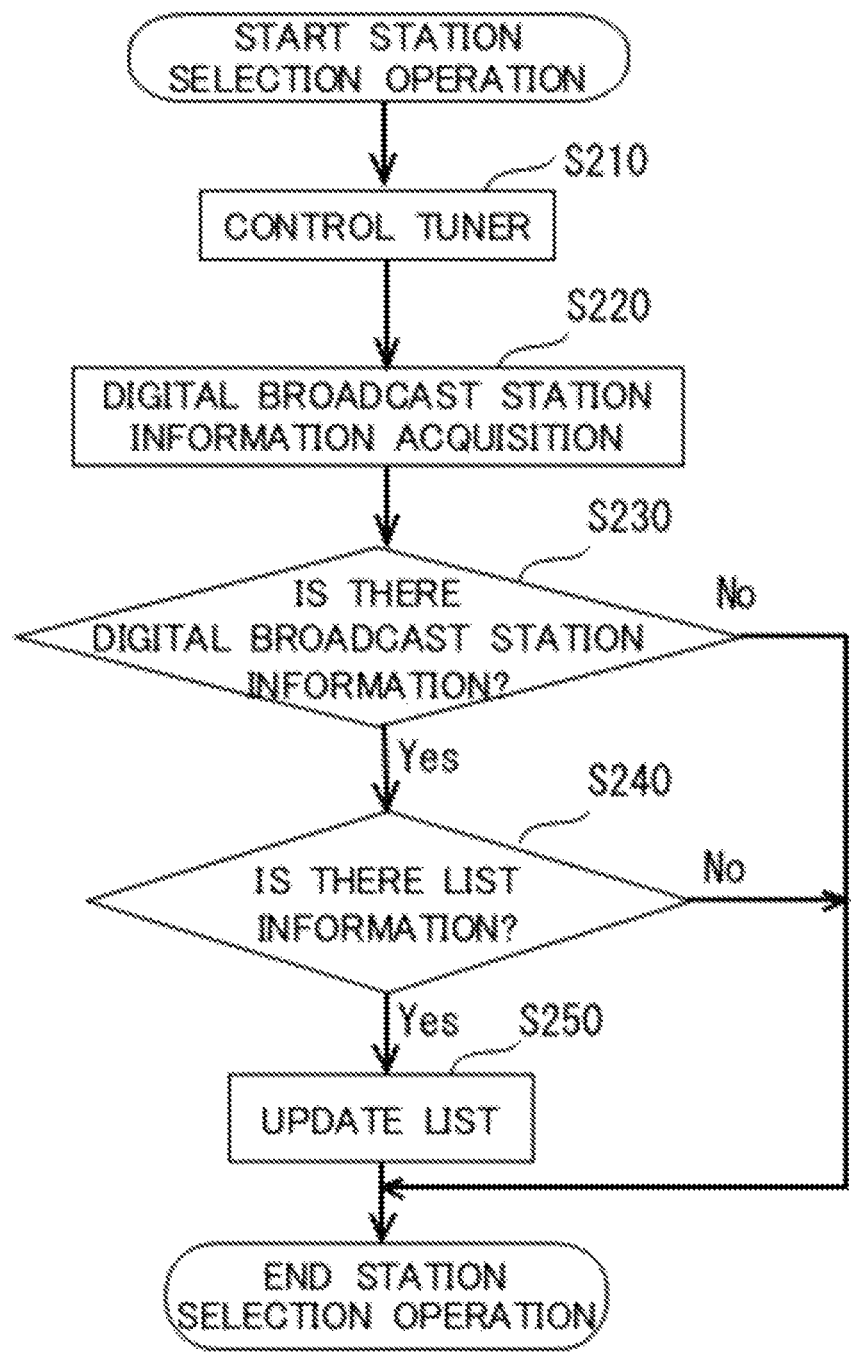
FIG. 4 is a flowchart illustrating one example of a station selection operation.

When the broadcast receiver 100 performs a station selection operation based on the operation input received by the operator 15, the broadcast receiver 100 may execute the station selection operation shown in a flowchart in FIG. 4.

In the flowchart shown in FIG. 4, the controller 13 first controls the tuner 1 to be tuned to the frequency specified by the operation input received by the operator 15 (a step S210).

Next, the controller 13 issues the command of "digital broadcast station information acquisition" to the digital demodulator 7 (a step S220). The digital demodulator 7 completes the decode process according to the command of "digital broadcast station information acquisition" and sends all the broadcast station information of the digital broadcast station corresponding to the frequency specified by the operation input received by the operator 15 to the controller 13.

However, in the case where a reception environment is bad, even when the decode process has been completed, in some cases, the digital demodulator 7 cannot acquire the broadcast station information. Therefore, in a step S230 following the step S220, the controller 13 determines whether or not the broadcast station information of the digital broadcast station corresponding to the frequency specified by the operation input received by the operator 15 has been acquired.

When it is determined that the broadcast station information of the digital broadcast station corresponding to the frequency specified by the operation input received by the operator 15 has not been acquired (No in the step S230), the broadcast receiver 100 ends the station selection operation.

On the other hand, when it is determined that the broadcast station information of the digital broadcast station corresponding to the frequency specified by the operation input received by the operator 15 has been acquired (Yes in the step S230), the controller 13 determines whether or not the digital broadcast station corresponding to the frequency specified by the operation input received by the operator 15 already exists in the broadcast station list (a step S240).

When it is determined that there is no digital broadcast station corresponding to the frequency specified by the operation input received by the operator 15 in the broadcast station list (No in the step S240), the broadcast receiver 100 ends the station selection operation.

On the other hand, when it is determined that the digital broadcast station corresponding to the frequency specified by the operation input received by the operator 15 exists in the broadcast station list (Yes in the step S240), the controller 13 destroys the broadcast station information that already exists in the broadcast station list of the digital broadcast station corresponding to the frequency specified by the operation input received by the operator 15 and reflects the broadcast station information newly acquired by issuance of the command in the step S220 in the broadcast station list (a step S250). Then, the broadcast receiver 100 ends the station selection operation.

By executing the station selection operation as shown in the flowchart in FIG. 4, the broadcast station information that already exists in the broadcast station list of the digital broadcast station corresponding to the frequency specified by the operation input received by the operator 15 can be updated even when the broadcast station list is not created. Therefore, in the case where the digital broadcast station changes the broadcast station information, it is possible to facilitate a resolution of the problem that the old broadcast station information remains in the broadcast station list.

<3. Modifications>

The various technological features disclosed in the present specification are able to be modified in various ways without departing from the spirit of the technological creation besides the above embodiments. Features of the above-described preferred embodiments and the modifications thereof may be combined appropriately as long as no conflict arises.

In the embodiments described above, the broadcast receiver 100 is a broadcast receiver that receives a radio broadcast, but the invention may be applicable to a broadcast receiver that receives a broadcast other than the radio broadcast (for example, a television broadcast).

In the embodiments described above, the broadcast receiver 100 is a broadcast receiver that receives a digital broadcast and an analog broadcast, but the invention may be applicable to a broadcast receiver that receives only the digital broadcast.

While the invention has been shown and described in detail, the foregoing description is in all aspects illustrative and not restrictive. It is therefore understood that numerous other modifications and variations can be devised without departing from the scope of the invention.

What is claimed is:

1. A broadcast receiver comprising a processor and an associated memory configured to:
control a tuner to scan a predetermined frequency band and search for a receivable broadcast station in the predetermined frequency band; and
create a list including at least the receivable broadcast station by acquiring information of the receivable broadcast station, wherein:
when there is a second receivable digital broadcast station at a frequency corresponding to a first digital broadcast station that already exists in the list when scanning, the processor omits acquisition of broadcast station information of the second digital broadcast station and uses broadcast station information of the first digital broadcast station that exists in the list as information of the second digital broadcast station, and even when there is the second receivable digital broadcast station at the frequency corresponding to the first digital broadcast station, the processor does not omit the acquisition of the broadcast station information of the second digital broadcast station when an elapsed time from a time at which the broadcast station information of the first digital broadcast station has been acquired exceeds a second predetermined time.

2. The broadcast receiver according to claim 1, wherein when there is no second receivable digital broadcast station at the frequency corresponding to the first digital broadcast station, the processor deletes the first digital broadcast station from the list.

3. The broadcast receiver according to claim 1, wherein even when there is the second receivable digital broadcast station at the frequency corresponding to the first digital broadcast station, the processor does not omit the acquisition of the broadcast station information of the second digital broadcast station when an ID of the second digital broadcast station does not correspond to an ID of the first digital broadcast station.

4. The broadcast receiver according to claim 3, wherein when an elapsed time from a time at which it has been previously confirmed whether or not the ID of the second digital broadcast station corresponds to the ID of the first digital broadcast station does not exceed a first predetermined time, the processor does not determine whether or not the ID of the second digital broadcast station corresponds to the ID of the first digital broadcast station.

5. A method of updating a broadcast station list, the method comprising the steps of:
(a) searching for a receivable broadcast station by scanning a predetermined frequency band; and
(b) creating a list of at least the receivable broadcast station by acquiring information of the receivable broadcast station, wherein:
when there is a second receivable digital broadcast station at a frequency corresponding to a first digital broadcast station that already exists in the list when scanning, the step (b) omits acquisition of broadcast station information of the second digital broadcast station and uses broadcast station information of the first digital broadcast station that exists in the list as information of the second digital broadcast station, and even when there is the second receivable digital broadcast station at the frequency corresponding to the first digital broadcast station, the step (b) does not omit the acquisition of the broadcast station information of the second digital broadcast station when an elapsed time from a time at which the broadcast station information of the first digital broadcast station has been acquired exceeds a second predetermined time.

6. A broadcast receiver comprising a processor and an associated memory configured to:

control a tuner to scan a predetermined frequency band and search for a receivable broadcast station in the predetermined frequency band; and create a list including at least the receivable broadcast station by acquiring information of the receivable broadcast station, wherein:

when there is a second receivable digital broadcast station (i) whose detected broadcast wave is received by the broadcast receiver at a strength equal to or more than a predetermined level and is (ii) at a frequency corresponding to a first digital broadcast station that already exists in the list when scanning, the processor omits acquisition of broadcast station information of the second digital broadcast station and uses broadcast station information of the first digital broadcast station that exists in the list as information of the second digital broadcast station, and even when there is the second receivable digital broadcast station (i) whose detected broadcast wave is received by the broadcast receiver at the strength equal to or more than the predetermined level and is (ii) at the frequency corresponding to the first digital broadcast station, the processor does not omit the acquisition of the broadcast station information of the second digital broadcast station when an ID of the second digital broadcast station does not correspond to an ID of the first digital broadcast station.

* * * * *